United States Patent [19]

Stephan

[11] Patent Number: 4,605,340

[45] Date of Patent: Aug. 12, 1986

[54] PILE SPLICE

[76] Inventor: Karl Stephan, 550 Inlet Dr., Marco Island, Fla. 33937

[21] Appl. No.: 594,258

[22] Filed: Mar. 28, 1984

[51] Int. Cl.⁴ .......................... E02D 5/10; E02D 5/30; F16B 7/00
[52] U.S. Cl. .................................. 405/252; 405/256; 52/726; 403/335; 403/381
[58] Field of Search ................ 405/231, 239, 250–252, 405/256; 403/294, 335, 381, 402; 52/722, 726, 728

[56] References Cited

U.S. PATENT DOCUMENTS

| | | | |
|---|---|---|---|
| 3,449,918 | 7/1969 | Fuentes | 405/252 |
| 3,650,553 | 3/1972 | Wennstrom | 405/251 X |
| 3,651,653 | 3/1972 | Mouton, Jr. | 405/252 |
| 3,884,589 | 5/1975 | Liedholm | 405/256 X |
| 3,930,373 | 1/1976 | Wahman | 405/252 |
| 3,961,491 | 6/1976 | Reddaway et al. | 405/231 |
| 4,009,550 | 3/1977 | Young | 405/256 X |
| 4,050,211 | 9/1977 | Wahman | 403/294 X |
| 4,070,120 | 1/1978 | Bald et al. | 403/335 X |
| 4,158,512 | 6/1979 | Hasselbacher | 403/294 |
| 4,479,575 | 10/1984 | Grundken et al. | 403/294 X |

OTHER PUBLICATIONS

"The Logical Choice, HARDRIVE", Associated Pile & Fitting Corp., Bulletin CS 823.
"Dyn-A-Splice by AJC, A-Joint Corp.

Primary Examiner—Cornelius J. Husar
Assistant Examiner—Nancy J. Stodola
Attorney, Agent, or Firm—Wood, Herron & Evans

[57] ABSTRACT

A pile splice includes two splice plates, each having a dove-tail shaped groove aligned with the groove in the abutting plate. Slip cams are disposed in the channel, defined by the grooves, for outward movement to draw the plates together. Drive wedges are driven between the slip cams to drive them outwardly to draw and hold the plates together and to form a massive, strong pile splice. Wedge forces are distributed to increase clamping forces. Headed reinforcing bars are securely held in the splice plates by plastic bushings to facilitate splice plate alignment and pile casting. Methods are provided.

30 Claims, 5 Drawing Figures

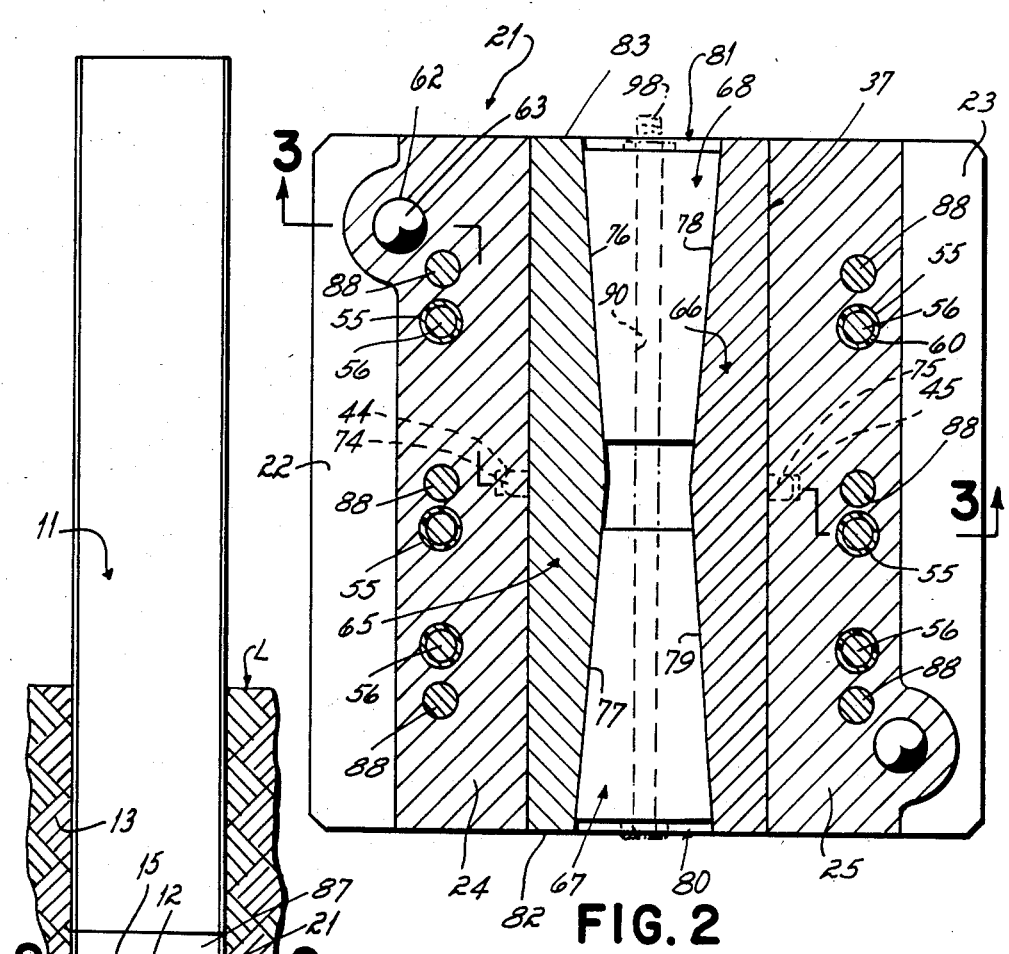
FIG. 1
FIG. 2
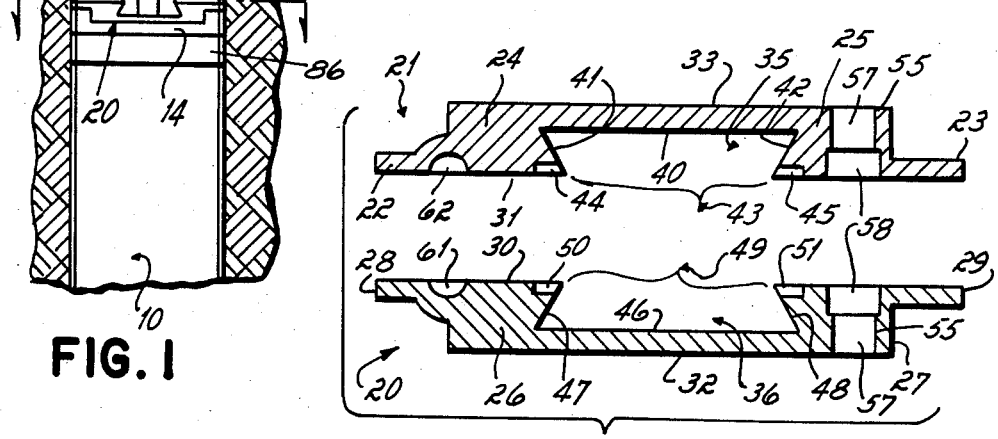
FIG. 5

PILE SPLICE

This invention relates to pile splicing and particularly to splicing apparatus for joining together the ends of concrete piles for driving and support.

Structural support pilings are frequently required to be driven to extensive depths. Where a piling is to be driving to a depth of 120 feet for example, the handling of such a lengthy concrete piling is attended by numerous difficulties. Obvious difficulties include that of transportation from the casting site to the construction site, awkardness of handling due to weight and length, and the necessity of large and expensive equipment to handle and drive the long piling.

It has accordingly been proposed to provide pilings of more reasonable lengths, such as 40 or 60 feet, for example, and to splice them together during the driving operation, thereby forming a long composite piling of short coaxially disposed piling segments. This eliminates the transportation, handling and driving difficulties presented by a piling 2 or 3 times longer, and heavier.

Known splices involve the use of end caps mounted on the ends of prestressed concrete piles to be spliced, and various devices to secure the end caps together at a point in time where the first pile has been substantially driven, and the next following pile is lifted over the driven pile.

In order for such splices to work consistently and well, the piles must be securely fastened together in aligned, coaxial condition, the splices being resistant to compression, tension, torsion and shear forces exerted on the pilings and the splice. If a splice permits movement of a pile in response to one or more of these forces, the composite piling may not be accurately placed, or may not be useful to effectively support the intended load. Also, if a piling is misaligned so that it is not coaxial with a prior driven piling, final position of the piling can be well out of tolerance.

Known splicing devices involve the use of numerous small clamps, driven into the corners of the splicing end caps for example, to secure together the bolts or flanges of opposing caps. These devices generally require the driving of four corner clamps after one piling is lifted over a driven piling. Such known clamps typically hold the piles together by way of relatively thin flange portions. Due to their number, to their size relative to the overall end caps, and to the requirement for exact tolerances in order to achieve both full clamping potential of each corner clamp and exacting pile alignment, these known systems, while apparently useful, have certain inherent deficiencies and inaccuracies. These may present or lead to clamping weaknesses, alignment inaccuracy or other deficiencies in resisting the compression, tension, torsion and shear forces mentioned above.

Moreover, in these known splices, four corner clamps or wedges must be driven, and in some cases bolts or other components added at each corner, increasing complexity and the time required to make the splice.

Also, in concrete pile splicing it is known to connect an end cap to reinforcing bars which are cast into the pile at the pile ends. It is desirable to align the bars in the pile during a pile casting operation, and to squarely align the splice, however, such alignment is generally difficult and time consuming to obtain without the use of jigs, positioners or the like.

Still further, it is desirable to positively secure the reinforcing bars to the end caps for added splice performance in rigidity, alignment accuracy and resistance of forces as noted above.

Accordingly, it has been one objective of the invention to provide an improved splicing apparatus for concrete pilings having improved alignment and strength characteristics.

It has been a further objective of the present invention to provide a pile splicing apparatus comprising, when formed, a monolithic-like splice.

A further objective of the invention has been to provide an improved pile splice providing exacting pile alignment and centering and reducing splicing time as compared to known pile splicing procedures.

A yet further objective of the invention has been to provide a pile splice and reinforcing bar apparatus for insuring accurate splice plate casting and reinforcing bar alignment during casting and in the finished pile.

A still further objective of the invention has been to provide improved apparatus positively securing reinforcing bars to splice plates in a pile splice apparatus.

To these ends, a pile splicing apparatus according to a preferred embodiment of the invention includes a splice plate mounted on the adjoining ends of two piles to be spliced together, each plate including a transverse, dove tailed shaped groove, open at the face surface of the plate, and disposed in alignment with the opposing groove of the adjoining plate, the groove defining a cam channel having inclined side walls, two slip cams for longitudinal insertion into the grooves and for outward camming movement, the slip cams having a cam edge comprising inwardly tapered surfaces cooperating with the tapered side walls of the cam channel formed by each plate for camming the two plates together, and further having tapered surfaces lying within the cam channel, and defining a wedge channel and two drive wedges for insertion longitudinally into the grooves, from opposite ends thereof, for driving the slip cams outwardly against the groove side walls to draw the splice plates together and to form a monolithic like splice.

Preferably, each slip cam and wedge has a semi-cylindrical passage or opening therein cooperating with each other to form openings which cause a redistribution of the outward wedging forces to the upper and lower surfaces of the slip cams to increase and facilitate the longitudinal clamping forces exerted by the cams on the respective plates. This structure concentrates the wedge forces at the respective bottoms of the splice plate grooves where the forces are translated into the most effective and secure clamping forces, as compared to any clamping forces exerted near the respective grooves' top openings.

The preferred splicing apparatus further includes, at opposite corners of each splice plate, a locating apparatus comprising corresponding semispherical indentations. Locating balls are placed within the indentations of a lower splice plate, for example, and an upper piling is lowered thereon, the balls serving to align the upper splice plate with the lower splice plate in exact coaxial and rotational alignment.

The splice plates are also provided with reinforcing bar bores having a larger diameter near the face surface of each splice plate and a coaxial bore of lesser diameter extending rearwardly therefrom. A deformable plastic bushing of a shape generally corresponding to that of the bores is inserted into each bore and a reinforcing bar, having an enlarged head, is driven into the plastic bushing which holds the reinforcing bar coaxially with the bore for proper alignment and squaring in the piling material as it is cast, and also serves to form a secure attachment of the reinforcing bar to the splice plate in the finally cast piling.

With such structure, a piling can be substantially driven and a second piling spliced thereto by simply lowering the second piling onto the driven piling, locating the upper piling on the lower by means of the locator balls, inserting of the two slip cams, and driving two wedges between the two slip cams to drive them apart, and thus secure the two splice plates and the pilings together. Thereafter, if desired, one or more bolts are run through both wedges and are tightened to hold both in place.

Such structure produces a splice having substantial resistance to compression, tension, shear and torsional forces which may be exerted on the pilings and the splice. As well, the structure provides a monolithic-like splice, where the cams and wedges are of significant mass as compared to the entire splice plate structure, and provide substantial rigidity and strength in the splice.

Moreover, it will be appreciated that the splicing procedure is very simple and does not require a driving of more than two drive wedges, yet provides a splice of substantial strength and rigidity.

Also, the reinforcing bars are securely held in the splice plates, extending perpendicularly and in parallel therefrom. This facilitates squaring of the plate with respect to the cast piling.

These and other objectives and advantages will be readily apparent from the following written description of a preferred embodiment of the invention and from the drawings in which:

FIG. 1 is an illustrative, elevational view showing two spliced pilings driven in soil;

FIG. 2 is a cross sectional view of the piling splice apparatus taken along lines 2—2 of FIG. 1;

FIG. 5 is a partial cross sectional view showing two opposed splice plates according to the invention.

Figure 3:
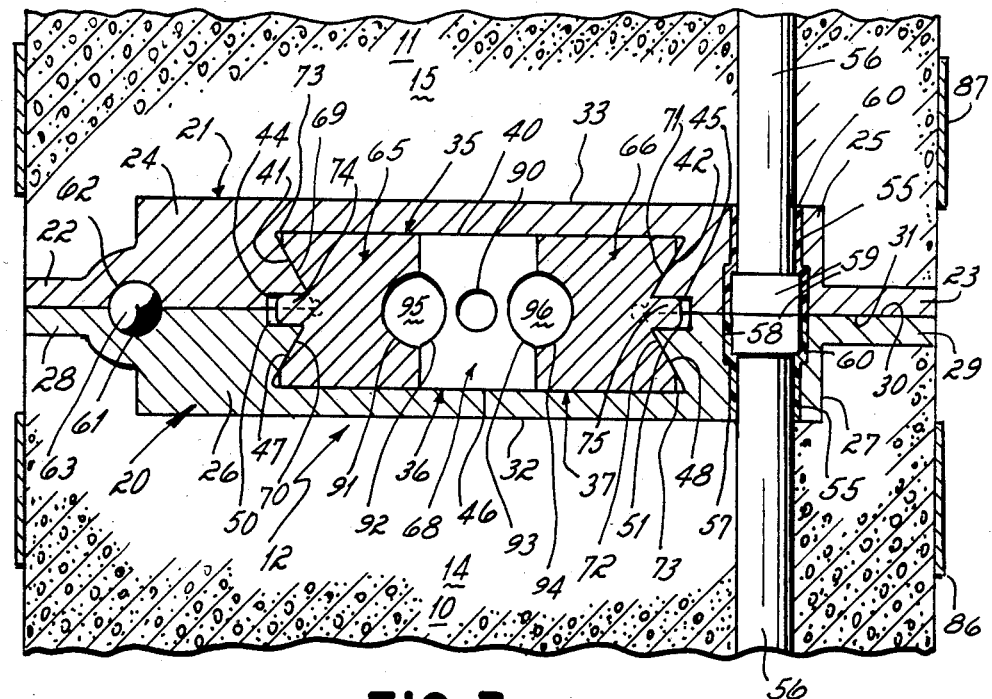
FIG. 3 is a cross sectional view of a piling splice apparatus taken along lines 3—3 of FIG. 2.

Turning now to the drawings, there is shown in FIG. 1 a spliced composite piling comprising piles 10 and 11 which are secured together by pile splicing apparatus 12 according to a preferred embodiment of the invention. The piling 10 was first driven into the soil 13 until the top end 14 of the pile 10 was just above the level L of the soil 13. Thereupon, pile 11 was hoisted over pile 10 and the lower end 15 of the pile 11 was lowered onto the pile 10. Splicing apparatus 12 was then utilized to securely splice the two piles 10 and 11 together. Thereafter, pile driving was continued by exerting driving forces on piling 11 to drive the composite piling further into the soil 13.

Splicing apparatus 12, as shown in FIG. 1, comprises a splice plate 20 and a splice plate 21 respectively secured to the adjoining ends of the pilings 10 and 11. Preferably, these plates are cast onto the ends of the respective pilings when the piles are cast.

Figure 4:
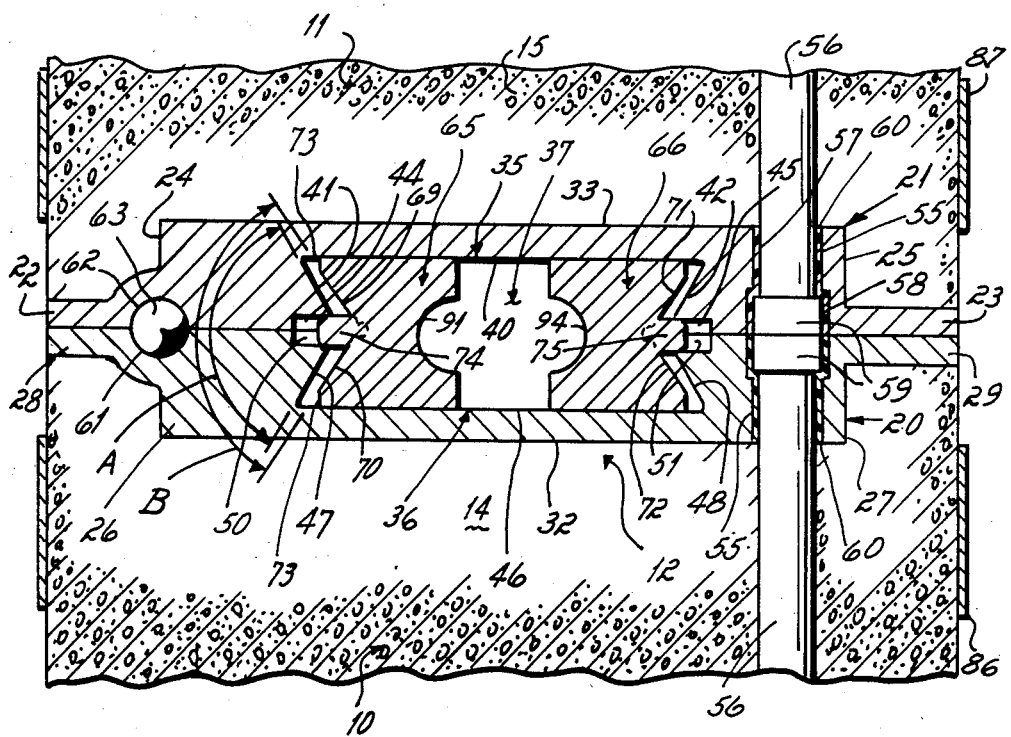
FIG. 4 is a cross sectional view similar to FIG. 3, but showing the slip cams in an intermediate position before the drive wedges are inserted and driven.

The splice plates 20 and 21 are substantially identical and the details of each plate are best seen in FIGS. 2, 3 and 5. In FIG. 2, various portions of the splice plate 21 are shown in plan view and in cross section. Referring to these Figs., the splice plate 21 includes side flanges 22 and 23, and elongated body portions 24 and 25. In FIG. 3, the splice plate 20 is provided with elongated body portions 26 and 27 and flanges 28 and 29. The splice plate 21 is provided with a dove-tailed shaped groove 35 extending transversely therethrough, while splice plate 20 is provided with a dove-tailed groove 36, also extending transversely therethrough. The grooves 35 and 36 define, when the splice plates are aligned and joined together, a cam channel 37 (FIG. 4).

The groove 35 is provided with a base 40 and inwardly tapering side walls 41 and 42 which lie in generally parallel disposition and which form, together with the base, an elongated dove-tail or trapezoidal shaped groove 35 having a top opening 43. Top opening 43 is narrower than the base 40, all as shown in FIG. 5. Relief portions or slots 44 and 45 are cut into the top edges of the groove 35 as shown in FIG. 5.

Also as shown in FIG. 5, the splice plate 20 includes a similar shaped groove 36, having base 46 and inclined, parallel side walls 47 and 48. Each of the side walls are tapered inwardly to form a top opening 49 which is narrower than the base 46. Also, slots 50 and 51 are relieved or cut into the side walls 47 and 48, respectively, of the groove 36.

It will be appreciated that the bases 40 and 46, when splice plates 20 and 21 are joined together, are substantially parallel and that the inwardly tapered side walls of the respective grooves are inclined upwardly and inwardly from their respective bases at an angle of about 60°. Accordingly, the inwardly tapering side walls converge, when the splice plates 20 and 21 are joined together, at an included angle of about 120°. Such angle is illustrated in FIG. 4 as angle "A".

Each of the splice plates 20 and 21 include a plurality of bores 55 for reception of reinforcing bars 56, which are generally known as "re-bars". However, the bores 56 each have, as shown in FIG. 3, a reduced bore portion 57 and an enlarged bore portion 58. Moreover, the reinforcing bars 56 are each provided with enlarged heads 59.

Inserted within each bore 55 is a deformable bushing, preferably manufactured from a synthetic material such as a resinous material. Such bushing reduces the internal diameters of the bore so that the effective bores are slightly less than the outer diameter of the reinforcing bars 56 and the respective enlarged heads 59.

This permits the reinforcing bars 56 to be driven into the bores 55 with the bushing 60 deforming to such an extent as to securely position and hold the reinforcing bars 56 within the bores 55. The bushing rigidly holds the bars within the bores 55 in an aligned condition, generally coaxial with the bores 55. Bars 56 may thus be held in a generally parallel disposition with respect to each other after having been driven into the respective splicing plates 20 or 21, as the case may be. Also, it will be appreciated that bars 56 extend perpendicularly to their respective slice plates, facilitating square alignment of the plates in a piling mold.

Each of the splicing plates 20 and 21 have respective facing surfaces 30 and 31 as shown in various figures. It will be appreciated that these surfaces 30 and 31 are adapted for adjacent, abutting engagement and disposition when the splice plates 20 and 21 are joined together. It will also be appreciated that the enlarged heads 59 of the reinforcing bars 56 are driven to a depth so that they are generally flush with the abutting surfaces 30 and 31.

Also, and for purposes of description, it will be appreciated that the grooves 35 and 36 are open to the surfaces 31 and 30, respectively, and that the slots 44, 45 and 50, 51 are disposed in the top and the facing surfaces 30 and 31 as shown. Of course, each of the splice plates 20 and 21 also include rearwardly facing surfaces 32 and 33 which are generally parallel to and opposite the facing surfaces 30 and 31. The respective rear surfaces 32 and 33 are adjacent the concrete material of the respective piles 10 and 11.

Each of the splicing plates 20 and 21 include a plurality of semi-spherical indentations, such as those shown at 61 and 62 for receipt of a locating ball 63. The semi-spherical indentations may be placed symmetrically about the splicing plates 20 and 21 and are integrally cast therein so as to be disposed in direct opposite alignment with an abutting splicing plate when the splicing plates are joined together. Thus, the splicing plates are easily aligned by way of insertion of a ball 63, for example, into the semi-spherical indentations 61 on splice plates 20, for example, and the lowering of the upper pile 11 over the pile 10 such that the spherical indentations of the splice plate 21 cover and align with the ball 63.

As shown in FIG. 2, each splice plate may include two diagonally disposed, semi-spherical indentations. In the alternative, of course, symmetrical indentations may be supplied in each splice plate so that the splice plates can be aligned in the appropriate 180° rotational disposition with respect to the other about a common coaxial pile axis.

In the preferred embodiment, the diagonal placement of the indentations insures the correct and operative disposition of the plates and grooves, as is apparent.

Turning now to the cams and wedges, the splicing apparatus 12 is provided with two slip cams 65 and 66 and two drive wedges 67 and 68. The slip cams 65, 66 are disposed within the cam channel 37 formed by the two grooves 35 and 36 of the respective splice plates 21 and 20. Each of the cams 65 and 66 has an outer camming surface comprising inwardly tapered surfaces 69, 70 and 71, 72, respectively, forming generally outer concave tapered cam surfaces. These surfaces 69, 70 and 71, 72 converge in a central area of the respective slip cam 65 and 66 at an included angle "B," as shown in FIG. 4. This angle "B" is preferably less than angle "A." Specifically, angle "B" is preferably about 118°. Accordingly, the tapered surfaces 69 and 70 are tapered inwardly at respective angles of about 59° from the respective bases of the grooves 35 and 36. Also, it will be appreciated that each of the surfaces 69, 70 and 71, 72 have flattened, relieved portions 73 so as not to interfere with the camming movement of the slip cams 65 and 66 as will be described.

The slip cams 65 and 66 are provided with respective centralized pins 74, 75 disposed at the apex of the convergence of the respective tapered side walls 69, 70 and 71, 72. These pins are structured to fit within the respective slots 44, 50 and 45, 51 of the respective splice plates when the splice plates are adjoined together. The longitudinal and the elevational dispositions of the pins 74, 75 with respect to the slots as described are respectively shown in FIG. 2 (longitudinal) and FIGS. 3 and 4 (elevational). The engagement of locator pins 74 and 75 prevent longitudinal movement of the slip cams 65 and 66 once the slip cams have been urged outwardly into camming engagement of splice plates 20 and 21.

The slip cams 65 and 66 each further include tapered surfaces 76, 77 and 78, 79, as best seen in FIG. 2. Opposed surfaces 77 and 79 define a tapered drive wedge channel 80, while opposed surfaces 76 and 78 define a tapered drive wedge channel 81. Each of the drive wedge channels 80 and 81 open outwardly in a longitudinal direction with respect to the splice plates 20, 21. As shown in FIG. 2, the surfaces 76, 77 and 78, 79 are very slightly tapered in order to receive relatively lengthy drive wedges 67 and 68. The drive wedges are each only slightly less than one-half the distance between the outer edges 82 and 83 of the respective splice plates.

It will be also appreciated that in order to secure the drive wedges 67 and 68 in the splice apparatus 12, a bolt 98 may be extended through the bores in the respective wedges so as to secure the drive wedges therein and prevent any rearward movement of the wedges so as to loosen the slip cams from the preferred camming engagement. It will also be appreciated that the bolting of the drive wedges together through the longitudinal bores 90 located in each drive wedge would serve to apply and maintain further wedging forces, urging the slip cams outwardly and thereby plates 20, 21 together. Also, semicylindrical relieved portions 91, 92 and 94, 93 in the respective slip cams and drive wedges form bores 95 and 96 through the splice.

By this means, the pressure exerted by the wedges 67, 68 on the slip cams 65, 66 is distributed to the upper and lower edges of the cams 65, 66. This action increases the pressure exerted by the cams 65, 66 at their outer edges near the relieved portions 73 so as to enhance and facilitate the clamping forces exerted on the plates 20 and 21. This distribution of clamping pressure is more desirable than the exertion of direct outer pressure across the entire slip cams by the wedges.

In other words, clamping forces exerted near the bottom of the grooves in the respective splice plates are more effective and provide more secure clamping, than clamping forces exerted near the grooves' openings where the plates abut. This structure facilitates exertion of larger and more substantial clamping forces by the cams as a result of the wedge movement therebetween, than if the relieved areas or openings were not provided.

It will also be appreciated that each of the pilings 10 and 11 may also be provided with an annular band, such as at 86 and 87, for reinforcing purposes.

Moreover, each of the pilings is provided with a number of prestressing cables 88 which are cast under tension into the concrete pilings and pass through the respective splice plates 20, 21 by any suitable means in order to prestress the piling with which the splice plate is associated. Typically, the piles may be cast in molds or forms 400 feet long and the cables prestressed from the ends of such forms. After curing, the cables can be cut outside the ends of the splice plates of each pile.

Turning now to FIGS. 4 and 5 of the drawings, it will be appreciated that when it is desired to join two pilings, each fitted with a respective splice plate 20, 21, one piling such as piling 11 is disposed above a lower piling 10 in general coaxial relationship therewith and the locator balls 63 are disposed in the semi-spherical openings of the lower splice plate such as splice plate 20. The upper piling 11 is then lowered carefully into place with the semispherical indentations of the upper splice plate 21 being directed over the locating ball 63 to accurately align the two splice plates 20, 21.

Once the piling 11 is rested on the piling 10 and the facing surfaces 30 and 31 of the respective splice plates 20, 21 lie in engagement, such as shown in FIGS. 3 and 4, the slip cams 65 and 66 are inserted longitudinally into the cam channel 37. After the slip cams 65 and 66 are inserted into the cam channel 37, the slip cams 65 and 66 are urged in an outwardly transverse direction, with respect to the pilings, so that the pins 74 and 75 engage and are received within the slots formed by slots 44, 50 and 45, 51. Thereafter, the drive wedges 67 and 68 are driven between the slip cams 65 and 66, thereby urging the slip cams 65 and 66 in an outwardly direction. This motion serves to bring surfaces 69, 70 into engagement with the tapered side walls 41, 47 of the respective splice plates 21, 20. Likewise, the tapered surfaces 71, 72 of slip cam 66 engage the tapered side walls 42, 48 of the respective splice plates 21, 20. Since the included angle of the surfaces 69, 70 is less than that of the included angle of the surfaces 41, 47, the slip cam 65 draws the splice plate 20, 21 together. Likewise, the included angle between the surfaces 71, 72, being less than the include angle of the surfaces 42, 48, also draw the splice plates 21, 20 together. This clamping action is derived by virtue of the driving of the drive wedges 67 and 68 inwardly so as to urge the slip cams 65, 66 outwardly.

Accordingly, it will be appreciated that the drive wedges 67, 68 are driven transversely to the splice plates in a longitudinal direction and within the respective grooves of the splice plates. As a result, the slip cams 65 and 66 are also driven in a transverse direction, but at 90° to the operational direction of the drive wedges. This movement results in the exertion of camming forces in a vertical direction, parallel to the elongated pilings 10 and 11, and is oriented at 90° with respect to the movement of the slip cams 65, 66. Once the drive wedges 67, 68 have been driven into place, as shown in FIGS. 2 and 3, the ends of the slip cams 65, 66, if desired, may be peened over, or slightly deformed in order to retain the drive wedges 67, 68 within the wedges channels 80, 81 so as to prevent undesirable separation of the splice apparatus. Of course, the wedges can be bolted together by a through bolt 98 to draw them inwardly and to lock them.

It will be appreciated that the splice apparatus 12, as described, produces an almost monolithic-like structure with the slip cams 65, 66 and the drive wedges 67, 68 comprising massive camming and wedging elements providing great strength to the piling splice and significantly resisting compression, tensile, shear and torsional forces which might be exerted on the pilings or the splice. The apparatus does not rely on a number of small wedges with relatively small wedging flanges in order to secure the splice plates together, and only requires the driving of two wedges in order to securely secure two adjacent piles together. Moreover, the spherical locating balls serve to align the piles to be adjoined not only coaxially, but rotationally, such that once the splice plates are in proper position, the piles are oriented in a rotational direction as well and remain so during driving of the drive wedges 67, 68.

Moreover, it will be appreciated that the reinforcing bars 56 are securely held within the splice plates 20, 21 and are maintained in a parallel disposition during a casting procedure by means of the bushings inserted between the bars and the bore surfaces of the splice plate. Accordingly, the splicing plates can be accurately and squarely positioned within pile casting molds and the reinforcing bars held in a parallel condition to insure the squareness and appropriate reinforcing bar alignment in the finished pile. Accordingly, the reinforcing bars do not require any extraneous jigs or positioners in order for alignment as the piling is cast and casting procedures are greatly improved.

Finally, of course, it will be appreciated that the thickness of the slip cams 65, 66 and of the drive wedges 67, 68 is approximately equal to the combined depths of the grooves 35 and 36 of the respective splice plates 21, 20. If desired, the thickness of the slip cams and drive wedges may be slightly less than the combined depths of the grooves in order to insure direct engagement of the facing surfaces 30 an 31 of the respective splice plates. Nevertheless, it will be appreciated that when the thickness of the slip cams and the wedges is approximately equal to that of the grooves, the entire pile driving forces and support forces are transmitted across the entire cross sectional area of the piling and through the splice plates, with the slip cams and drive wedges actually transmitting not only tensile but compressive forces as well.

Accordingly, it will be appreciated that the preferred embodiment of the invention provides a monolithic-like splicing apparatus for securing concrete pilings together and providing substantial resistance to compression, tension, shear and torsion forces which may be exerted on the pilings or splicing apparatus. As well, the invention facilitates pile alignment during the splicing operation and provides a secure, very strong splice, requiring only the insertion of two drive wedges operating against the slip cams to form a strong splice.

These and other advantages and modifications will become readily apparent to those of ordinary skill in the art and the applicant intends to be bound only by the claims appended hereto.

I claim:

1. Splicing apparatus for joining pilings together and comprising:

a splice plate adapted to be mounted on each of the adjoining ends of two piles to be joined together, each said plate including a groove extending from one side of said plate to another therein;

at least two movable, separate and independent cam means for disposition on opposite sides of said grooves within adjoining plates for drawing said plates together, and drive wedge means, independent of said cam means, for engaging and expanding said cam means within said grooves to draw and hold adjacent splice plates together.

2. Splicing apparatus as in claim 1, wherein each splice plate includes a substantially flat face surface and wherein said groove is a longitudinal transverse groove therethrough, said groove having a wide base, a relatively narrow top opening at said face, and inclined parallel side walls between said base and top opening, said side walls converging toward said top opening.

3. Splicing apparatus as in claim 2, wherein said cam means comprises two movable slip cams disposed in generally parallel disposition within aligned adjacent grooves of adjacent splice plates, each slip cam having an outer cam edge comprising tapered surfaces aligned with respective inclined side walls of adjacent grooves for camming said plates together.

4. Splicing apparatus as in claim 3, wherein the tapered surfaces of each slip cam converge at an apex forming an included angle and further including a locating pin extending outwardly from said apex.

5. Splicing apparatus as in claim 4, wherein said groove in each slice plate includes opposed locating slot means at the top opening thereof, for receiving said locating pins.

6. Splicing apparatus as in claim 3, wherein said slip cams each have inner tapered surfaces generally extending along and diverging outwardly of ends of said aligned grooves and wherein said drive wedge means have tapered wedge surfaces for slidably engaging the inner tapered surfaces of said slip cams and urging them outwardly into camming engagement with said inclined side walls of said grooves.

7. Splicing apparatus as in claim 6, wherein said inclined side walls of said grooves extend inwardly at about 60° from the base of the respective groove, converging, when two splice plates are joined, at an included angle of about 120°, and wherein the outer tapered surfaces in said slip cams converge at an included angle of about 118°.

8. Splicing apparatus as in claim 3, wherein said inclined side walls of said grooves converge, when said two splice plates are joined, at an included angle of about 120°, and wherein said outer tapered surfaces in said slip cams converge at an included angle of about 118°.

9. Splicing apparatus as in claim 1, further including bores extending through said splice plates and reinforcing bar means extending through said bores rearwardly of said plates, and further including heads on said reinforcing bar means, said bores each having a bar receiving portion and a head receiving portion of larger diameter than the bar receiving portion, and deformable bushing means disposed in said bores for receiving and holding said reinforcing bar means perpendicularly to said splice plate means.

10. Splicing apparatus as in claim 1, wherein each splice plate includes a pile abutting side and an opposite face surface and further including locating means in said face surfaces proximate edges thereof for orienting two adjacent splice plates and their respective piles during a splicing operation.

11. Splicing apparatus as in claim 10, wherein said locating means comprise a plurality of indentations in each splice plate, one indentation in each plate disposed in a position so as to be aligned with the indentation in another splice plate when two splice plates are properly aligned, and a locating ball for disposition within corresponding aligned indentations for aligning adjoining splice plates and their respective piles during a pile splicing process.

12. Splicing apparatus for joining pilings and comprising:
two splice plate means for mounting on respective ends of pilings to be joined;
each said splice plate means having an outward face for abutting adjacent like splice plate means;
at least one dove tail shaped groove extending through each splice plate means from one side to another, said grooves forming a single cam channel when said two splice plate means are abutted;
two slip cam means for insertion in said cam channel in said plate means and for drawing said means together; and
drive wedge means for insertion between said two slip cam means for driving said slip cams apart to draw said splice plate means together.

13. Splicing apparatus as in claim 12, wherein said drive wedge means is operatively movable in a first transverse direction to drive said slip cam means outwardly, in a second transverse direction at about 90° to said first transverse direction, to draw said splice plate means together, and wherein said splice plate means move together in a longitudinal direction of about 90° with respect to said second transverse direction in response to said movement of said slip cam means.

14. Splicing apparatus as in claim 13, wherein said single elongated cam channel extends transversely across said plates and is disposed transversely to said longitudinal direction,
said groove in each plate having a wide base, a relatively narrower top opening at said adjoining surface, and inclined, parallel side walls, converging, when two splice plates are joined together, at an included angle between 0° and 180°.

15. Splicing apparatus as in claim 14, wherein each said slip cam means includes outer inclined camming surfaces for engaging the side wall of said grooves, and converging together at an included angle less than that of the included angle between said side walls.

16. Splicing apparatus as in claim 15, wherein the included angle of said converging side walls of said grooves is about 120° and the included angle of said outer inclined camming surfaces of said slip cam means is about 118°.

17. Splicing apparatus as in claim 15, wherein each said slip cam means further comprise inner walls converging centrally of said adjoining splice plates and defining, with an opposite slip cam means, at least one tapered drive wedge channel, narrower centrally of said splice plates than at an edge thereof.

18. Splicing apparatus as in claim 15, wherein each slip cam means includes a locator pin extending outwardly from an apex of said included angle of said camming surfaces, and said plates each including locator slots disposed in said top openings of said grooves for receiving said slip cam locator pins.

19. Splicing apparatus as in claim 12, further including face surfaces on each splice plate means for engaging a face surface of another splice plate means, and locating means disposed in said surfaces comprising aligned indentations in said surfaces comprising aligned indentations in said adjoining surfaces and a locator element disposed for capture within said aligned indentations.

20. Splicing apparatus joining together two prestressed concrete pilings, said splicing apparatus comprising:
two splice plates, each adapted for connection to the adjacent ends of respective pilings, said plates having abutting facing surfaces;
an elongated groove through each plate, each groove extending across a respective face surface of each plate and said grooves aligned with an operatively communicating with each other, each of the grooves having a wide bottom and a relatively narrower top opening with inwardly inclined side surfaces lying in planes parallel to each other;
two slip cams, each having an elongated camming surface means for engaging parallel adjacent groove side surfaces of said splice plates and drawing said plates together, and each slip cam further having internal inwardly tapering surface means defining a wedge channel; and two drive wedges having a thickness approximately equal to the combined depth of two adjacent grooves of adjacent splice plates and further having inwardly tapering converging side walls;

said drive wedge means disposed between the inwardly tapering surfaces of said slip cams wherein movement of said driven wedges into said wedge channel urges said slip cams outwardly to engage converging side surfaces in the aligned grooves of adjacent splice plates to draw and hold them together.

21. Splicing apparatus as in claim 20, further including fastener means for drawing and holding said two drive wedges in said wedge channel.

22. Splicing apparatus as in claim 21, wherein said fastener means includes a bolt extending through said wedges.

23. Splicing apparatus for joining pilings and said apparatus comprising:

an end splice plate for connection to an end of a piling to be joined to another splice plate and piling;

a groove extending across each plate, said grooves being open to abutment surfaces of said respective plates and aligned in parallel disposition to each other to form a cam channel when said plates are disposed adjacent each other to join two pilings together, said grooves having parallel, inclined side walls, converging when said plates are joined together;

two separate and independent slip cams disposed within said cam channel and having cam surface means for engaging said inclined side walls and drawing said plates together by exerting a longitudinal force thereon when said slip cams are moved transversely toward respective inclined side walls of said grooves; and drive wedge means for insertion between said slip cams and wedging said slip cams apart to exert said longitudinal force on said splice plates.

24. Splicing apparatus as in claim 23, further including fastener means extending through said wedge means for holding said wedge means between said slip cams.

25. Splicing apparatus as in claim 23, wherein said slip cams and said drive wedge means include cooperating relieved portions defining means therebetween for distributing pressures exerted on said cams by said wedge means.

26. A splice plate for use in splicing pilings together, said splice plate comprising:

a facing surface;

a transverse dove-tail shaped groove extending across and open to said facing surface, said groove having a base wider than the opening of said groove in said surface and parallel, inclined side walls; and locating slot means open to, and in operative communication with, said groove.

27. A splice plate as in claim 26, further comprising: semi-spherical indentations in said facing surface.

28. A splice plate as in claim 27, including two semi-spherical indentations symmetrically disposed in said surface, on opposite sides of said groove.

29. A method of splicing together two piles, each having a splice plate on abutted pile ends and aligned dove-tail shaped grooves in each plate, the method comprising the steps of:

positioning one pile over another in substantial coaxial relationship therewith;

inserting slip cams in a channel formed by said grooves;

inserting a wedge between said slip cams; and urging said slip cams outwardly to engage inclined sides of said dove-tail shaped grooves and drawing said plates and said piles together by driving at least one wedge between said slip cams.

30. A method as in claim 29, wherein said cam urging step includes increasing clamping force by urging respective upper and lower portions of said slip cams outwardly while at least a portion of each slip cam between said upper and lower portions is not engaged by said wedge.

* * * * *